Oct. 2, 1956
C. P. RHEES
2,764,853
MOUNTING HEAD FOR GRINDING, POLISHING, AND FEATHEREDGING TOOLS
Filed March 12, 1956
3 Sheets-Sheet 1
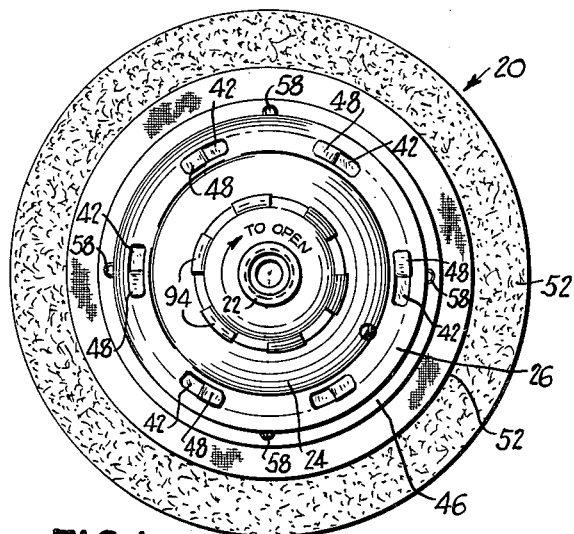
FIG.1.
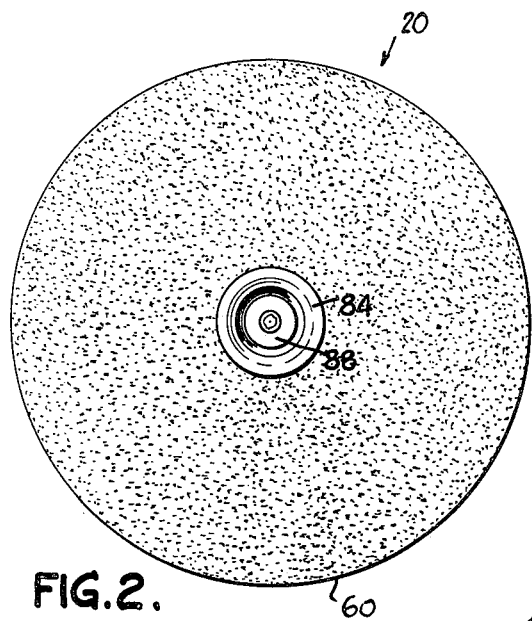
FIG.2.
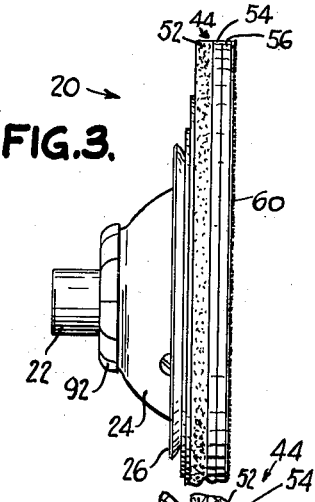
FIG.3.
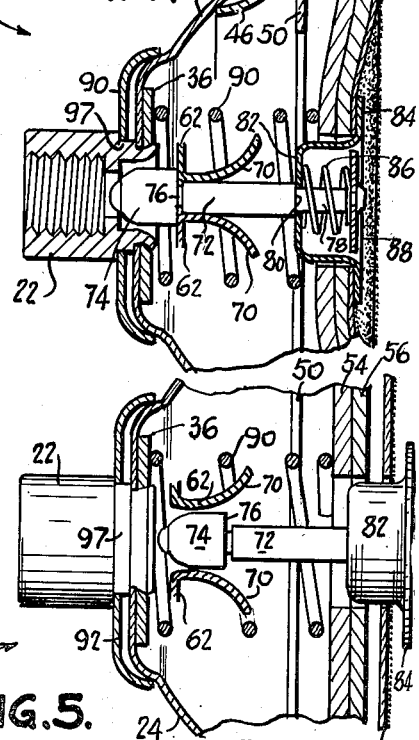
FIG.4.
FIG.5.
INVENTOR.
CARM P. RHEES.
BY
Lucy Freeman
ATTORNEY.

Oct. 2, 1956

C. P. RHEES 2,764,853

MOUNTING HEAD FOR GRINDING, POLISHING, AND
FEATHEREDGING TOOLS

Filed March 12, 1956

INVENTOR.
CARM P. RHEES.
BY
*Percy Freeman*
ATTORNEY.

Oct. 2, 1956 C. P. RHEES 2,764,853
MOUNTING HEAD FOR GRINDING, POLISHING, AND
FEATHEREDGING TOOLS
Filed March 12, 1956 3 Sheets-Sheet 3
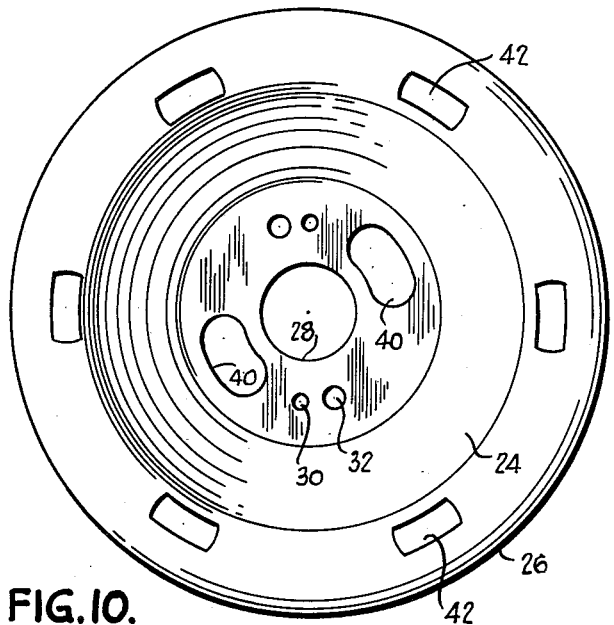
FIG.10.
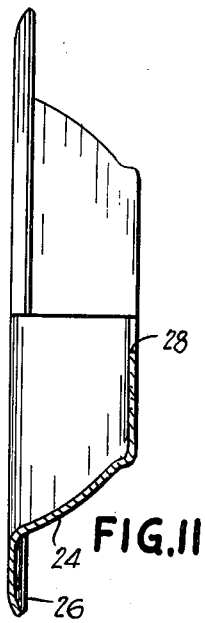
FIG.11.
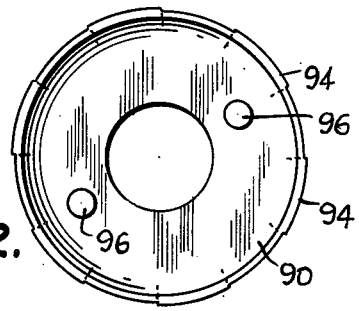
FIG.12.
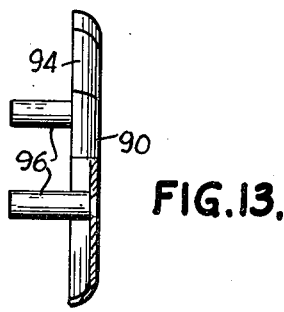
FIG.13.
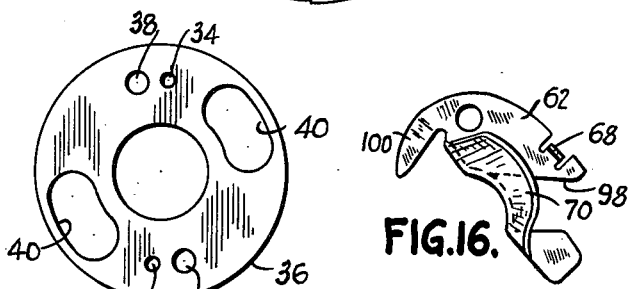
FIG.14.
FIG.16.
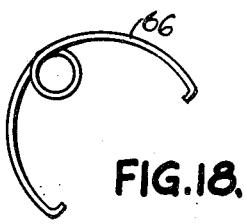
FIG.18.
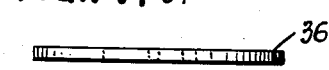
FIG.15.
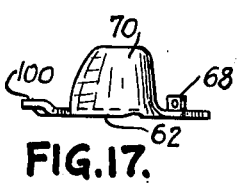
FIG.17.
INVENTOR.
CARM P. RHEES.
BY
Percy Freeman
ATTORNEY.

United States Patent Office 2,764,853
Patented Oct. 2, 1956

2,764,853

MOUNTING HEAD FOR GRINDING, POLISHING, AND FEATHEREDGING TOOLS

Carm P. Rhees, Staten Island, N. Y.

Application March 12, 1956, Serial No. 570,825

6 Claims. (Cl. 51—197)

This invention relates to tools of the type that are employed for grinding, polishing and feather-edging, and more particularly to the mounting head for such tools.

Tools of the aforementioned kind are necessarily employed for rapid and high speed use. They are basically time saving devices that when used correctly and efficiently require that the various parts or appliances to be used in connection therewith be changed often to suit the needs of the job and of the opeartor employing the tool on the job. Therefore, it is important that the means employed to connect or attach the appliances to such tools be of sturdy construction, and simple operation. Such a structure will of consequence be efficient in operation requiring a minimum of moving parts and minimum of manipulations, and a clear absence of the need of mechanical skill to operate the same.

Accordingly features and objects of the invention reside in the provision of a novel quick connect and disconnect mounting head that requires but a single application of pressure to attach an appliance to the tool, and a single manual movement to disconnect the same from the tool. The novel mounting head of this invention is of such construction as to provide for long life and use requiring few moving parts yet operating with foolproof efficiency.

Further features of the novel mounting head permit the cooperating parts thereof to a sink and substantially disappear within the contour of the appliance connected to the tool, thereby eliminating interference with the working surface of the appliance.

A further feature and object of the invention resides in novel means that resist relative slippage between the appliance attached to the tool and the tool to which it is connected.

Other and further objects of my invention reside in the structures and arrangements hereinafter more fully described with reference to the accompanying drawings in which:

Fig. 1 is a top view of the novel mounting head made in accordance with the teaching of the invention and includes a sanding disc appliance attached thereto.

Fig. 2 is a bottom view of the mounting head in Fig. 1.

Fig. 3 is a partial side view of the mounting head in Fig. 1.

Fig. 4 is a fragmentary sectional view of the operating portion of Fig. 1 in locked position.

Fig. 5 is a view similar to Fig. 4, but with the locking parts thereof in their disengaged position.

Fig. 10 is a bottom view of the mounting head cover plate.

Fig. 11 is a side view partially in section, of the mounting plate in Fig. 10.

Fig. 12 is a bottom view of the release knob.

Fig. 13 is a side view partially in section, of the knob in Fig. 12.

Figs. 14 and 15 are plan and side views respectively of the mounting plate.

Figs. 16 and 17 are bottom and side views respectively, of the locking fingers, and Fig. 18 is a plan view of the biasing spring for the locking fingers.

Figure 6:
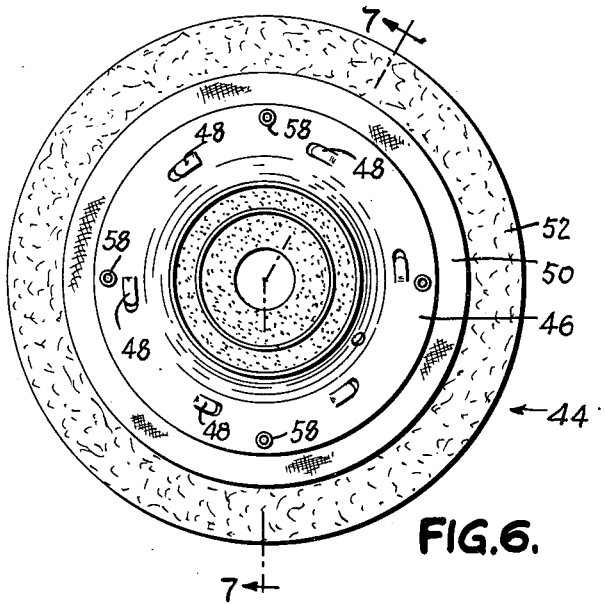
Fig. 6 is a top view of the pressure pad that forms the support means for the appliances to be connected with the tool.

Referring now to Figs. 1 to 5 inclusive of the drawings wherein the mounting head structure is generally identified by the numeral 20. The mounting head 20 is adapted to be secured to a drive shaft (not shown) of a tool of the aforementioned type by way of a reversely, internally threaded hub 22. The thread in the internal opening of the hub 22 is such as to provide a tightening engagement between the same and the tool to which it is threaded when the tool is in operation.

Fixedly secured to a narrowed lower neck of the hub 22 is a cover plate 24 which extends radially outwardly from the hub for a small distance and then flares smoothly downwardly into a curved upturned lip 26. The structural details of the cover plate are more clearly shown in Fig. 10 and 11 wherein it will be noted that the central opening 28 thereof is adapted to slide over the lower narrowed neck of the hub 22.

The cover plate 24 is provided with a first set of small diameter holes 30 and a second set of relatively larger diameter holes 32. The first set of smaller holes 30 coincide with a first set of small holes 34 provided in a mounting plate 36, to secure the cover plate and mounting plate together when the mounting plate is also fixedly positioned about the narrowed neck of the hub 22. With the mounting plate 36 thus secured to the hub 22 and to the cover plate 24 there is provided in both the cover and mounting plates a coinciding set of openings. One of these sets includes the larger holes 32 in the cover plate 24 and similar size holes 38 in the mounting plate 36 for a purpose which will presently be described. Another set of openings comprises arcuately shaped elongated slots 40.

Provided on the lip 26 of the cover plate 24 are a further series of arcuate openings which may be termed connector openings 42 (see Fig. 10). The purpose of the connector openings 42 is to provide for a releasable engagement between the cover plate and an appliance support means generally identified in the drawings (see Figs. 6 and 7) by the numeral 44.

For ease of description, the appliance support means 44 is divided or broken down into two structures, namely, a disc holder and a driving disc structure, neither of which is identifiably numbered in the drawings. The disc holder includes a connector plate 46 flaring upwardly in its central portion to coincide with the inside of the dome-shaped cover plate 24. It has a radially directed flange from which there is struck a plurality of projections 48.

The projections 48 provide a means to releasably connect the appliance support means 44 with the lip 26 of the cover plate 24. There is an equal number of such projections 48 as there are openings 42 in the lip 26 with the projections 48 and openings 42 being spaced for coinciding cooperation to permit the connector plate 46 to be placed against the bottom of the lip 26 with the projections 48 moving through the openings and then upon relative rotation of the connector and cover plates, to move the same relative to the openings 42 to provide a secure engagement between the two plates. Besides the connector plate 46, the disc holder structure also includes a backing plate 50 positioned adjacent a pliable pad 52. The pliable pad 52 is preferably composed of felt or a felt composition so that it will have the required resistance to unnecessary movement, yet be sufficiently pliable to give when so required.

The driving disc structure which is formed integrally with the disc holder structure previously described to complete the appliance support means 44, includes a flexible disc 54 that is sandwiched between the pliable pad 52 and a molded gum rubber disc 56. The gum rubber disc 56 has its outer surface molded with very minute suction cups not shown in the drawings, but which grip any appliance that is placed thereagainst with sufficient suction to prevent relative rotative movement between such appliance and the drive shaft of the tool to which the mounting head 20 is applied.

Figure 7:
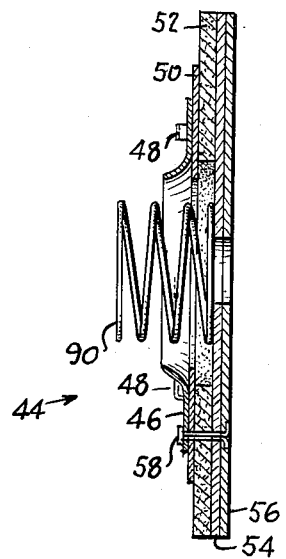
Fig. 7 is a sectional view of Fig. 6 taken along lines 7—7.

Referring now to Figs. 1, 6 and 7, it will be noted that the disc holder structure and the driving disc structure are made integral to complete the appliance support structure 44 by passing through each of the elements of these structures suitable fastening means 58. The disc holder elements of the appliance support structure 44 each have a central opening defined therein. The elements of the driving disc structure also have a central opening therein, but these latter openings are of smaller diameter than those in the elements of the disc holder structure. As a consequence, when the appliance support means 44 is connected to the cover plate 24 by way of the struck projections 48 passing through and locking about the openings 42, there results a central compartment with the cover plate 24 and mounting plate 36 forming the upper confines of the compartment and the flexible disc 54 defining the lower confines.

Located within the aforementioned compartment is a locking mechanism presently to be described that is adapted to secure appliances to the mounting head 20. In Fig. 4 of the drawings one such appliance, namely, a sanding disc 60 is secured in position, while the same disc 60 in Fig. 5 of the drawings is either about to be secured to the mounting head 20, or, if it is so desired, about to be removed therefrom.

Figures 8, 9:
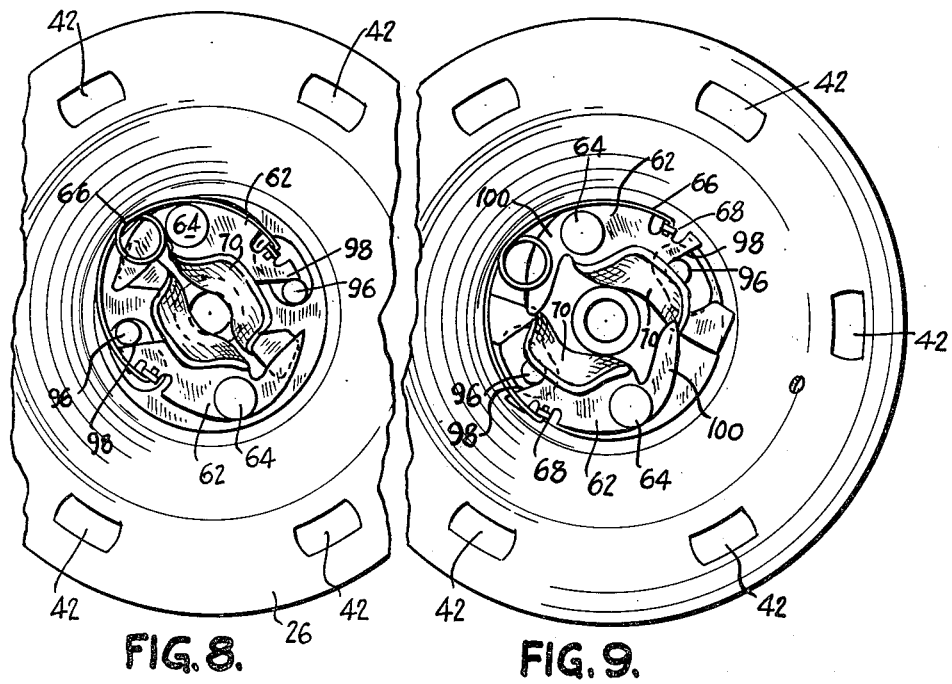
Fig. 8 is a bottom view of the locking mechanism of the mounting head with the parts thereof shown in their normal locking position.
Fig. 9 is a bottom view of the locking mechanism of the mounting head with the parts thereof shown in their open or released condition.

The locking mechanism included in the compartment of the mounting head 20 comprises a pair of fingers 62, one of which is shown in greater detail in Figs. 16 and 17. The fingers 62 are pivotally mounted about their respective pivots 64 which extend into the openings 38 in the mounting plate 36, and also the openings 32 of the cover plate 24. The pivots 64 are stationary and are so secured to the mounting plate and cover plate to provide proper support for the locking fingers 62. The locking fingers 62 are normally and constantly biased radially inward toward the center of the mounting head 20 by a finger biasing spring 66 (Figs. 8, 9 and 18).

The finger biasing spring 66 is securely attached to each of the relatively movable fingers 62 by fitting within holes provided in downturned lugs 68 thereon. Each finger is provided with a smoothly curved downwardly tapering entrance 70 which, when both of the fingers 62 are biased to their closed position such as shown in Figs. 4 and 8, combine to provide complementary sides of an entranceway.

Movable for engagement with the pair of locking fingers 62 is a locking stud 72 (Figs. 4 and 5). The locking stud 72 is provided with a head 74 of enlarged area and tapering smoothly to a dome at the top end thereof. This enlarged head 74 forms a locking shoulder 76 on the narrowed stud 72. The locking shoulder 76 is adapted to be engaged with the flat upper surfaces of the locking fingers 62 when the head 74 thereof moves through the entranceway 70 of each of the fingers and therebeyond to permit the fingers to be actuated by the biasing spring 66 into engagement with the same beneath the head.

At the other lower end of the locking stud 72 is a narrowed shank 78 which forms a cup engaging shoulder 80. Positioned for longitudinal movement on the narrowed shank 78 is a cup member 82 that has a radially outwardly directed flange 84. The flange 84 is adapted to engage an appliance such as the sanding disc 60 shown in Figs. 3 to 5 to retain the same in locked position with respect to the mounting head structure 20. The flange 84 is, therefore, of sufficient radial dimension to engage a sufficiently large portion of the disc 60 to retain the same in its desired position.

The cup 82 is normally urged and retained against the shoulder 80 by a compression spring or cup biasing spring 86 (Fig. 4) which is also retained circumposed about the narrowed shank 78 by an end manually depressible button 88. The button 88 is retained on the narrowed shank by spinning, swaging or suitably heading the end of the shank about the rear of the same.

Located within the compartment defined by the cover plate 24 and the flexible disc 54 of the appliance support structure 44 is a compression spring 90 that bears at its one end on the bottom of the mounting plate 36 and at its other end on the top of the flexible disc 54. As it appears more clearly in Figs. 4, 5 and 7 of the drawings, the compression spring 90 constantly urges the flexible disc 54 away from the cover plate 24.

Since the disc 54 is formed integrally with the remaining elements of the appliance support structure 44, this force placed on it by the spring 90 is transmitted to the releasably engageable projections 48, thereby constantly insuring that the projections 48, when inserted through the holes 42 and rotated relatively to the cover plate 24, will form a secure engagement therewith. This secure engagement will prevent a tendency on the part of the appliance support structure 44 from accidentally releasing its connection with that of the cover plate 24.

At the same time, the compression spring 90 also bears on the disc 54 with sufficient pressure to bulge the same downwardly and outwardly away from the hub 22, thus tending constantly to move the two discs 54 and 56 away from the hub 22 and the cover plate 24. This urging action will be explained in greater detail later.

When it is desired to attach an appliance such as the sanding disc 60 to the mounting head, the head 74 of the stud 72 is inserted through the central opening generally provided in such appliance. Thereafter, the headed portion 74 of the stud is inserted through the central opening in the disc 56, thence 54, and into engagement with the flared entrances 70 of the diametrically positioned radially pivotable locking fingers 62. Upon continued movement of the stud 74 between the entrances of the fingers 62, the fingers are caused to pivot in opposition to the normal urging of the spring 66 and to spread sufficiently to permit the head to pass therebeyond.

The pressure or forward movement applied to the stud 74 to move it beyond the locking fingers 62 is applied to the rear of the button 88. This pressure need only be thumb or index finger pressure sufficient to overcome the normal urging of the compression spring 90 and the radial urging of the finger biasing spring 66. Once the head 74 is moved in beyond the fingers 62, the same automatically close radially about the stud 72 to engage with the shoulder 76.

It will be recognized that during the accomplishment of the aforementioned operation, when finger pressure is applied to the back of the button 88, the discs 56, 55 are caused to bend inwardly into the compartment wherein the spring 90 is located. This occurs because the distance between the locking shoulder 76 and that of the button 88 is less than the normal distance between the locking portion of the fingers 62 and the outer appliance engaging surface of the disc 56. As a result, when the fingers engage the shoulder 76, the flange 84 of the cup 82 and the button 88 sink below the effective working surface of the appliance 60 now attached to the mounting head.

To provide for the proper amount of flexibility, the spring 86 compresses slightly when finger pressure is exerted on the button 88 to move the head 74 and its shoulder 76 into engagement with the locking fingers 62. Normally, however, the spring 86 applies sufficient pressure against the cup 82 to retain it in engagement with the cup shoulder 80. Thus the compressive locking action performed by the combination of the springs 86 and 90 and as applied to the cup 82 and its flange 84 and by the spring 90 to the discs 54 and 56, is sufficient to sandwich or retain the appliance 60 against the suction cups molded in the appliance engaging surface of the disc 56.

In order to effect the release or disengagement of the shoulder 76 from the fingers 62, there is provided a release knob 92 having finger ridges 94 (see Figs. 12 and 13) rotatably mounted about a shoulder 97 on the hub 22. The knob 90 has fixed thereto a pair of finger actuating pins 96 (see Figs. 8, 9, 12 and 13). The pins 96 extend downwardly and through respective arcuate openings 40 in both the cover plate 24 and in the mounting plate 36 to engage with actuating surfaces 98 on the fingers 62.

Thus, when it is desired to pivot the fingers 62 radially outwardly to spread the opening of their entranceway as defined by their entrances 70, thereby to disengage the same from the shoulder 76 on the stud 72, the knob 90 is merely rotated about the head 22. The pins 96 then move rotatively in the arcuate openings 40 and ride along the actuating surfaces 98 of their respective fingers 62, thereby spreading the fingers in opposition to the normal urging of the biasing spring 66.

This spreading of the fingers 62 disengages them from the shoulder 76 to release the locking engagement therebetween. Immediately upon the release of this locking engagement, the spring 90 formerly compressed by the locking engagement previously mentioned, expands against the discs 54 and 56 to move the stud 72 out of the mounting head compartment. Thereafter, the disc 60, if worn, may be substituted for by a new one, or perhaps, if it is desired, an entirely different appliance may be secured to the mounting head 20.

During the aforementioned spreading of the fingers 62, there is a limiting cooperation that may take place between a tail 100 provided on each of the fingers 62 and an adjacent portion of the entranceway 70 on the oppositely moving locking finger. Thus, the cooperation between the tails 100 and the entrances 70 on adjacent radially movable fingers 62 limit the radial outward movement of the fingers to prevent unnecessary movement of the same.

If at times it is desired to employ or change the appliance supporting structure 44 by employing a different or substitute structure, the same is easily and rapidly disengaged from the cover plate 24 by rotating the same relatively to each other until the projections 48 align fully with the openings 42. At that time the spring 90 normally compressed between the cover plate 24 and its mounting plate 36, and the appliance support structure 44, applies pressure to the latter to move the projections 48 outwardly through the openings 42 to effect the desired disengagement.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:

1. A mounting head for a tool having a drive shaft, said mounting head comprising a hub adapted to be secured to said drive shaft, a cover plate fixed on said hub, an appliance support means comprising a disc holder and a driving disc holder including a connector plate, a backing plate and a pliable pad, said driving disc being secured integrally with said disc holder and including a pair of flexible discs, one of which abuts said pliable pad, the other being molded of gum rubber with exposed suction surface means to resist relative rotation of said appliances to be attached to said drive shaft, said connector plate having means cooperating with said cover plate to releasably attach said appliance support means thereto and to form therewith a compartment, and means in said compartment cooperating to releasably secure said appliances to said suction surface for rotation by said drive shaft.

2. A mounting head for a tool as in claim 1, said disc holder having a central opening, said driving disc having a central opening smaller than that of said disc holder, a compression spring in said compartment bearing against said driving disc about the opening thereof to urge the same in a direction away from said cover plate.

3. A mounting head as in claim 1 said means in said compartment comprising a mounting plate fixed on said hub, radially pivotable fingers on said mounting plate, spring means urging said fingers radially inwardly, a release knob rotatable on said hub having means cooperating with said fingers to move the same radially outwardly, a locking stud having a head at one end thereof defining a locking shoulder for locking engagement with said fingers and a narrowed extension defining a cup shoulder at its other end, an appliance engaging cup on said extension, a button on said extension, and spring means between said button and cup.

4. A mounting head for attaching grinding, polishing and feather-edging appliances to a drive shaft of a tool comprising a hub for attachment to said drive shaft, a mounting plate on said hub, locking fingers pivoted radially on said mounting plate, spring means biasing said fingers radially inwardly to a locking position, appliance support means connected to said mounting head and having a surface for securing said appliances thereto, a central opening defined in said support means, compression spring means between said mounting plate and said support means to urge the latter away from the former, a locking stud projecting through said central opening and having an enlarged head at one end thereof defining a locking shoulder for engagement with said fingers, a button on the other end of said stud, a cup movable along said stud and having an annular appliance engaging flange, a stud spring between said button and cup urging said cup away from said button, the distance between said locking shoulder and said button being less than that between said mounting plate and said support surface, so that the annular flange depresses said support surface when said fingers engage said locking stud, and a release knob engageable with said fingers to bias the same radially outwardly to a release position to enable said compression spring to move said stud from engagement with said fingers.

5. In a mounting head for attaching grinding, polishing and feather-edging appliances to a drive shaft of a tool comprising a hub for attachment to said drive shaft, a mounting plate on said hub, locking fingers pivotable radially on said mounting plate, spring means to move said fingers radially inwardly to their locking position, a locking stud having an enlarged head, button means on said stud for moving said head between said fingers to separate the same, said head terminating in a locking shoulder engageable by said fingers after said head has moved therebeyond, a cup on said stud having an appliance retaining flange to retain said appliance on said mounting head when said fingers engage said locking shoulder, spring means to move said stud from engagement with said fingers, and release means cooperable with said fingers to release the same from locking engagement with said shoulder.

6. A mounting head for a tool having a drive shaft, said mounting head comprising a hub to be secured to said drive shaft, a cover plate mounted on said hub, and including openings therein; a disc holder including a connector plate having fingers for releasably engaging said cover plate through said openings, a backing plate and a felt pad; a driving disc including a flexible disc and a gum rubber disc, said driving disc being secured to said disc holder; said disc holder and driving disc each having a central opening with the opening in said driving disc being of a smaller diameter than said disc holder and said gum rubber disc having an exposed surface molded with suction cups; a locking mechanism including a mounting plate fixed on said hub and having arcuate openings defined therein, locking fingers pivotally mounted on said mounting plate for relative radial movement and having actuating surfaces thereon, spring means biasing said fingers radially inwardly, a release knob rotatably mounted on said hub and having pins extending therefrom through said arcuate openings for engagement with said actuating surfaces to move said fingers radially outward; a compressed spring between said mounting plate and said flexible disc to urge the latter away from the former; and a stud including a head depending from one end thereof and movable between said fingers to separate the same and having a shoulder under which said fingers grip, a cup and button on the other end of said shank, and spring means between said button and cup.

No references cited.